United States Patent

[11] 3,556,139

[72] Inventor Nikolai Vasilievich Yalovega
    Skhodnyal, ul. Michurina, 6, kv. 19,
    Moskovskaya oblast, U.S.S.R.
[21] Appl. No. 783,547
[22] Filed Dec. 13, 1968
[45] Patented Jan. 19, 1971

[54] SHUTOFF VALVE FOR HYDRAULIC SYSTEMS
    16 Claims, 4 Drawing Figs.
[52] U.S. Cl. ................................. 137/554,
    137/625.66, 137/596.18, 251/61.1
[51] Int. Cl. ........................................F16k 37/00,
    F16k 31/145
[50] Field of Search........................................ 251/61,
    61.2, 61.1; 137/544, 596.18, 625.66

[56] References Cited
    UNITED STATES PATENTS
    1,109,705 9/1914 Serrell et al.................. 251/61.2X
    2,676,609 4/1954 Pfarrer......................... 251/61X
    2,969,806 1/1961 Jensen et al. ................. 137/554X Primary Examiner—Henry T. Klinksiek
Attorney—Waters, Roditi, Schwartz & Nissen ABSTRACT: A shutoff valve for a hydraulic system comprises a hermetic body having an inlet and an outlet for the medium handled by the system. Inside the body is a closing member adapted to open and close the outlet and an elongated pliable chamber with resilient walls is connected to the closing member. The chamber is supplied with a working medium, preferably a compressed gas under pressure and the chamber has an oval shape and is installed so that it acts on the closing member in the direction of the smaller axis of the chamber. The chamber may contain transmitters therein for indicating the position of the chamber walls in order to effect automatic control of the supply of the working medium into the chamber.

SHUTOFF VALVE FOR HYDRAULIC SYSTEMS

The present invention relates to shutoff valves for hydraulic systems which operate, mainly, with high temperature aggressive media, and are employed in atomic and other power plants and in the technological processes of the chemical industry.

Known in the art are shutoff valves in which closing members are actuated by a pliable chamber in the form of a bellows, deformable in the direction of its longitudinal axis when the working medium is fed into the inside space.

Also known are shutoff valves in which the closing member is actuated by a rod, while the pliable chamber plays the role of a sealing separating member between the working medium and the hydraulic medium.

The known shutoff valves have the following disadvantages: under the conditions of high temperature and aggressive media the shape and stiffness of the bellows vary; the force developed by the bellows drive depends on the bellows diameter, which requires their being thick walled and bulky; the stroke of the closing member in the bellows drive is comparatively small; the bellows cannot be made of high-melting alloys such as those based on columbium or molybdenum.

An object of this invention is to provide a simple and small-size shutoff valve for hydraulic systems, operating mainly with high-temperature aggressive media, which valve will retain its stiffness without changing its shape while handling aggressive media at high temperatures.

Another object consists in providing a required stroke of the closing member.

Still another object of the invention is to insure a considerable shutoff force.

In compliance with these and other objects, the invention consists in that in the shutoff valve for hydraulic systems operating mainly with high-temperature aggressive media, wherein the closing member is actuated by a pliable chamber, deformed by the working medium, for example, compressed gas, the chamber, with resilient walls according to the invention, is elongated and has an oval, mostly elliptical, cross section, and is installed so that it interacts with the closing member in the direction of the smaller axis of the chamber.

It is expedient to make the walls of the pliable chamber of a high-melting alloy, based preferably on columbium.

It is also expedient to make the walls of the pliable chamber from several separate layers.

It is desirable to fasten the closing member directly to the walls of the pliable chamber.

In a three-way version of the shutoff valve it is expedient to use two pliable chambers with individual systems of working medium supply, each chamber interacting with one of the closing members.

For the automatic control of the system supplying the working medium into the spaces of the pliable chamber, it is desirable to install at least one transmitter, indicating the position of the walls of said chamber.

Other objects and advantages of the present invention will become apparent from the description that follows in conjunction with the accompanying drawing, in which.

Figure 1:
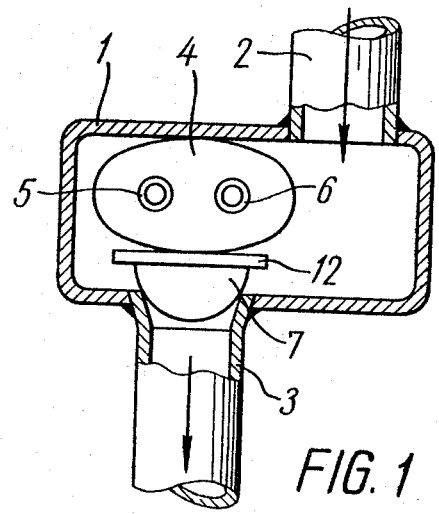
FIG. 1 is a cross section of shutoff valve for hydraulic systems operating mainly with high temperature aggressive media, according to the invention.

In describing the present embodiment of the invention terms in their narrow sense are used for the sake of clarity. However, the invention is not confined to the terminology so adapted, and it will be understood that each of such terms embraces all the equivalent elements performing similar functions and employed for the same purposes.

The shutoff valve for hydraulic systems operating mainly with high temperature aggressive media comprises a hermetic body 1 (FIG. 1) with an inlet connection pipe 2 and an outlet connection pipe 3, a pliable chamber 4 with transmitters 5 and 6, said chamber being installed in the body 1, and a closing member 7.

Figure 2:
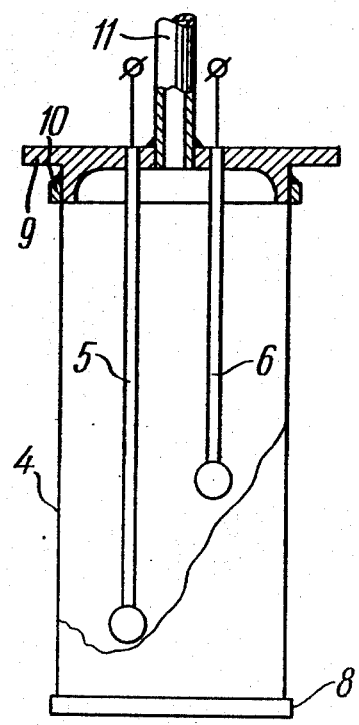
FIG. 2 is a partly cutaway view of a pliable chamber complete with transmitters.

The pliable chamber 4 (FIGS. 2 and 3) according to the invention is elongated and has an oval cross section, mostly elliptical (FIG. 1).

In the exemplary embodiment under consideration, the pliable chamber 4 is made from a thin-walled blank of a high-melting alloy based on columbium or molybdenum, one end of said blank being compressed by a plate 8 and welded thereto. The pliable chamber 4 may be either all stamped or welded. The walls of the pliable chamber may be made as multilayer ones when the chamber is made of other resilient materials, suitable for the hydraulic system in question. The multilayer structure of the walls of pliable chamber 4 promotes its elasticity and prolongs its service life.

The pliable chamber 4 is connected to the body 1 by means of a cover 9 (FIGS. 2 and 3) to which the chamber is connected by a ring 10. The pliable chamber 4, cover 9 and ring 10 may be either welded to one another or joined by some other method.

The transmitters 5 and 6, generally electrical, are intended to indicate the positions of the walls of the chamber 4 and are installed in this chamber, being fastened to the cover 9.

The transmitters are located at different heights, which allows indicating various positions of the walls of the pliable chamber 4.

Connected hermetically to the cover 9 is a pipe 11, through which the working medium, for example, compressed gas, is fed into the space of the pliable chamber.

The closing member 7 is fastened outside the pliable chamber 4 to the wall thereof. It may be installed freely in case of the opposing flow of the medium.

The closing member 7 is of a hemispherical shape with a flat supporting base 12, contacting the wall of the pliable chamber 4. Other shapes for the closing member are also feasible.

The three-way version (FIG. 4) of the shutoff valve comprises two pliable chambers 4 having, each, an individual system for the supply of working medium and resting on an inner flange 13 welded to the body 1. Each chamber 4 has it own electrical transmitters 5 and 6 and interacts with its closing member 7 which opens and closes the respective pipe connections 3 which may be either an inlet or an outlet depending on the design of the hydraulic system and the direction of flow of the hydraulic medium in said system.

The shutoff valve for hydraulic systems, according to the invention, functions as follows.

Figure 4:
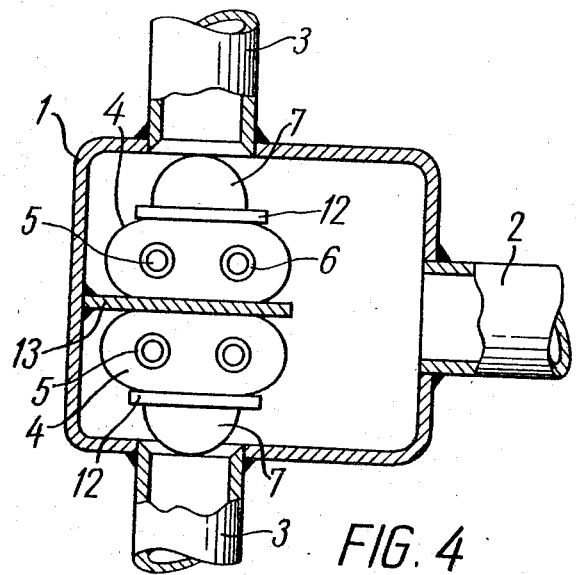
FIG. 4 is a cross section of a three-way version of the shutoff valve.

The hydraulic medium, generally at high temperature, enters the hermetic body 1 from the hydraulic system through the inlet pipe connection 2 and leaves it through the outlet pipe connection 3. In this case the closing member 7 is lifted by the pressure, built up by the hydraulic medium and by the discharge of the working medium, for example, compressed gas, from the pliable chamber 4 through the pipe 11. (The open position of the closing members 7 is shown in FIG. 4).

Figure 3:
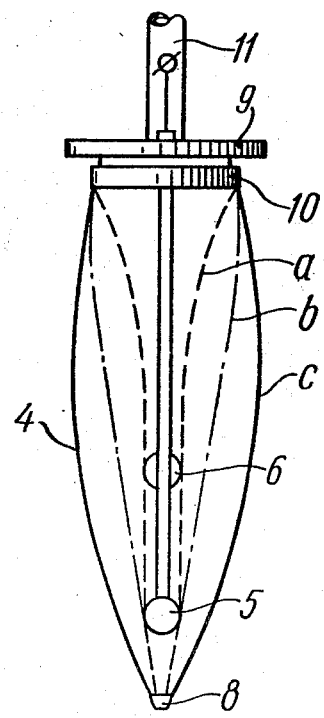
FIG. 3 is a side view of the same.

The walls of the pliable chamber 4 yield until they come into contact with the electric transmitters 5 and 6 (dotted lines $a$ in FIG 3, open position). Thus, the transmitters 5 and 6 indicate that the closing member 7 is in the open position.

To close the outlet pipe connection 3 (or the outlet pipe connections in the case of the three-way valve) the working medium, for example, compressed gas, is fed into the pliable chamber 4 through the pipe 11.

The chamber 4 expands in the direction of its smaller axis and its walls come to the position, shown in FIG. 3 by dotted lines $b$ (middle position of the closing member 7). In this position the walls of the chamber 4 actuate the closing member 7 which overlaps the clear area of the outlet pipe connection 3.

In this case the transmitter 6 goes out of contact with the walls of the pliable chamber 4, but the transmitter 5, in contact with the walls sends a signal indicative of the outlet pipe connection 3 being shutoff. The supply of hydraulic medium from the system through the pipe connection 2 is thus discontinued.

With the closing member 7 in the middle position, when the working medium is neither fed into nor discharged from the chamber 4, the pressure in the hydraulic system can be easily determined by the readings of the pressure gage (not shown in the drawing) communicating with the pipe 11.

In case of an emergency pressure drop in the hydraulic system the pliable chamber 4 is expanded due to an excessive pressure difference since the pressure of the working medium in the chamber remains unchanged. As the chamber expands, its walls come out of contact with the transmitter 5 and take the position shown by the continuous lines c (closed position of the closing member 7).

The transmitter 5 produces a signal indicative of the emergency pressure drop in the hydraulic system.

Thus, by feeding the working medium into or discharging it from the pliable member 4 one can vary the hydraulic resistance in the system within the limits from the nominal value (open position of the closing member 7) to the maximum one (outlet pipe connection 3 being fully closed).

The three-way version of the shutoff valve makes it possible to calibrate the pumps and flowmeters volumetrically, this being most essential, particularly for experimental adjustments of hydraulic systems of power plants.

The shutoff valve for hydraulic systems, according to the invention, has the following advantages.

The elongated pliable chamber 4 mostly of an elliptical cross section allows obtention of maximum stroke and force in the direction of its smaller axis, which ensures reliable overlapping of the clear area of the outlet pipe connection 2 or inlet pipe connection 3 by the closing member interacting with said chamber.

The pliable chamber 4 made of a high-melting alloy based on columbium or molybdenum excludes the adverse effect of the high temperature aggressive media on the shape and stiffness of the chamber, which insures dependable functioning of the valve in said media. The use of the pliable chamber of oval, mostly elliptical, shape considerably simplifies the shutoff valve and reduces its dimensions.

The supply of the working medium, for example, compressed gas, directly into the pliable chamber 4 assures reliability and safety of the entire hydraulic system, especially of the hydraulic system operating with high temperature aggressive media, as the pliable chamber 4 is made of high-melting alloy, preferably, based on columbium.

The use of the transmitter 5 and 6 indicating the position of the walls of the pliable chamber 4 makes it possible to effect automatic control of the supply of working medium into said chamber 4 and, consequently, to control the operation of the entire hydraulic system.

While a specific embodiment of the invention has been disclosed in the description, it will be understood that various modifications and changes within the spirit and the scope of the invention may occur to those skilled in the art.

These changes and modifications can be resorted to without departing from the concept or the scope of the invention as hereinafter defined by the appended claims.

I claim:

1. A shutoff valve for hydraulic systems operating mostly with high temperature aggressive media comprising: a hermetic body installed in the hydraulic system; an inlet pipe connection of the hydraulic system connected to said body; an outlet pipe connection of the hydraulic system also connected to said body; a closing member installed in said body to open and close said outlet pipe connection; an elongated pliable chamber with resilient walls, and means for supplying said chamber with a working medium under pressure; the chamber having an oval shape and being installed so that it interacts with the closing member in the direction of the smaller axis of the chamber.

2. A shutoff valve according to claim 1, wherein the walls of the pliable chamber are made of a high-melting alloy, based on columbium.

3. A shutoff valve according to claim 2, wherein the walls of the pliable chamber comprise several separate layers.

4. A shutoff valve according to claim 2, wherein the closing member is fastened directly to the walls of the pliable chamber.

5. A shutoff valve according to claim 2, wherein said valve is three-way and has two pliable chambers with individual working medium supply, each of said chambers interacting with a respective closing member.

6. A shutoff valve according to claim 2, wherein for automatic control of the working medium supply into the pliable chamber, at least one transmitter is provided therein for indicating the position of the chamber walls.

7. A shutoff valve according to claim 1, wherein the walls of the pliable chamber comprise several separate layers.

8. A shutoff valve according to claim 7, wherein the closing member is fastened directly to the walls of the pliable chamber.

9. A shutoff valve according to claim 7, wherein said valve is three-way and has two pliable chambers with individual working medium supply, each of said chambers interacting with a respective closing member.

10. A shutoff valve according to claim 7, wherein for automatic control of the working medium supply into the pliable chamber as least one transmitter is provided therein for indicating the position of the chamber walls.

11. A shutoff valve according to claim 1, wherein the closing member is fastened directly to the walls of the pliable chamber.

12. A shutoff valve according to claim 11, wherein said valve is three-way and has two pliable chambers with individual working medium supply, each of said chambers interacting with a respective closing member.

13. A shutoff valve according to claim 11, wherein for automatic control of the working medium supply into the pliable chamber at least one transmitter is provided therein for indicating the position of the chamber walls.

14. A shutoff valve according to claim 1, wherein said valve is three-way and has two pliable chambers with individual working medium supply, each of said chambers interacting with a respective closing member.

15. A shutoff valve according to claim 14, wherein for automatic control of the working medium supply into the pliable chamber at least one transmitter is provided therein for indicating the position of the chamber walls.

16. A shutoff valve according to claim 1, wherein for automatic control of the working medium supply into the pliable chamber at least one transmitter is provided therein for indicating the position of the chamber walls.